UNITED STATES PATENT OFFICE.

WILLIAM G. LINDSAY, OF CALDWELL, NEW JERSEY, ASSIGNOR TO THE CELLULOID COMPANY, OF NEW YORK, N. Y., A CORPORATION OF NEW JERSEY.

SOLVENT OF ACETYL CELLULOSE.

1,188,800.  Specification of Letters Patent.  Patented June 27, 1916.

No Drawing. Application filed May 24, 1912. Serial No. 699,539.

*To all whom it may concern:*

Be it known that I, WILLIAM G. LINDSAY, a citizen of the United States, residing in Caldwell, county of Essex, State of New Jersey, have invented certain new and useful Improvements in Solvents of Acetyl Cellulose, of which the following is a specification.

The various compositions to which the present invention relates are employed in the arts, sometimes as imitations of natural substances and sometimes as films which are used for photographic purposes.

Although the final or useful form of the different compounds of acetyl cellulose is that of a solid or dry material, the different processes of conversion into this final solid form involve, as is well understood, the employment of solutions or mixtures of varying consistency as to elasticity, stiffness, or fluidity, depending generally upon the proportion and kind of solvent used to the amount of the original base—acetyl cellulose.

In the manufacture of acetyl cellulose plastic masses by means of methyl alcohol in combination with a "solid solvent" such as paraethyltoluolsulfonamid and the production of solutions for the manufacture of lacquers, varnishes, photographic films, and flexible compounds, I have discovered that the addition of trichlorethylene to the mixture imparts valuable properties to the resultant product, such as increased toughness, plasticity, and flexibility.

In carrying out this invention I prefer a mixture of trichlorethylene and methyl alcohol in substantially equal proportions. This produces a liquid which has the property to gelatinate that variety of acetyl cellulose which is freely soluble in acetone, and it is to that variety of cellulose that this invention relates. This liquid will gelatinate the variety of cellulose mentioned in the cold, or at ordinary room temperature, and the mass so obtained may be worked up into plastic compounds by the addition of paraethyltoluolsulfonamid or other similar substances, such as ethyl acetanilid, tetrachlorethyl acetanilid, methyl acetanilid, and camphor. I prefer, however, paraethyltoluolsulfonamid, especially if it is mixed in combination with triphenyl phosphate. Paraethyltoluolsulfonamid exerts a strong solvent action under manipulation with heat and pressure, and the triphenyl-phosphate imparts non-inflammability to the mass.

An example of carrying out my invention is as follows:—To 10 parts of acetyl cellulose of the variety specified I add 20 parts by weight of paraethyltoluolsulfonamid and 20 parts of triphenyl-phosphate. After carefully stirring these solid ingredients together in order to effect a fairly uniform distribution, I add 100 parts by weight of a mixture composed of from 50 to 62 parts by volume of trichlorethylene and from 50 to 32 parts by volume of methyl alcohol. The combination thus obtained is then worked up in a kneading machine, and after a uniform mixture is obtained the excess of volatile solvent is allowed to evaporate and the resultant dough-like mass is then further worked up in the well-known manner of making nitro-cellulose-camphor compounds.

Having thus described my invention, what I claim is:—

1. A solvent for that variety of acetyl cellulose which is freely soluble in acetone which comprises trichlorethylene and methyl alcohol.

2. The composition of matter which comprises that variety of acetyl cellulose which is freely soluble in acetone trichlorethylene, paraethyltoluolsulfonamid, and methyl alcohol.

3. The composition of matter which comprises that variety of acetyl cellulose which is freely soluble in acetone trichlorethylene, paraethyltoluolsulfonamid, triphenyl phosphate and methyl alcohol.

4. A solvent for that variety of acetyl cellulose which is freely soluble in acetone which comprises 50 to 62 parts by volume of trichlorethylene and 50 to 32 parts of methyl alcohol.

WILLIAM G. LINDSAY.

Witnesses:
 WILLIAM DARRINGTON,
 J. HINDON HYDE.

Correction in Letters Patent No. 1,188,800.

It is hereby certified that in Letters Patent No. 1,188,800, granted June 27, 1916, upon the application of William G. Lindsay, of Caldwell, New Jersey, for an improvement in "Solvents of Acetyl Cellulose," an error appears in the printed specification requiring correction as follows: In line 59, for the numeral "10" read *100;* and that the said Letters Patent should be read with this correction therein that the same may conform to the record of the case in the Patent Office.

Signed and sealed this 22d day of August, A. D., 1916.

[SEAL.]
F. W. H. CLAY,
*Acting Commissioner of Patents.*

Cl. 106—40.